US008628866B2

(12) United States Patent
Singh et al.

(10) Patent No.: US 8,628,866 B2
(45) Date of Patent: Jan. 14, 2014

(54) MAGNETIC RECORDING MEDIUM, MANUFACTURING METHOD THEREOF, AND MAGNETIC RECORDING/REPRODUCING DEVICE

(75) Inventors: Amarendra K Singh, Singapore (SG); Daizo Endo, Singapore (SG); Voon Siang Khoang, Singapore (SG); Xiao Chen, Singapore (SG)

(73) Assignee: Showa Denko HD Singapore Pte Ltd., Singapore (SG)

( * ) Notice: Subject to any disclaimer, the term of this patent is extended or adjusted under 35 U.S.C. 154(b) by 25 days.

(21) Appl. No.: 13/132,039

(22) PCT Filed: Dec. 1, 2009

(86) PCT No.: PCT/JP2009/006514
§ 371 (c)(1),
(2), (4) Date: May 31, 2011

(87) PCT Pub. No.: WO2010/064409
PCT Pub. Date: Jun. 10, 2010

(65) Prior Publication Data
US 2011/0235211 A1    Sep. 29, 2011

(30) Foreign Application Priority Data
Dec. 1, 2008   (JP) .................................. 2008-306655

(51) Int. Cl.
*G11B 5/667* (2006.01)
*C23C 14/00* (2006.01)

(52) U.S. Cl.
USPC ..................................... 428/828.1; 204/192.2

(58) Field of Classification Search
None
See application file for complete search history.

(56) References Cited

U.S. PATENT DOCUMENTS

| 5,997,698 | A * | 12/1999 | Mino et al. ................ 204/192.2 |
| 6,926,974 | B2 | 8/2005 | Kawato et al. |
| 8,164,862 | B2 * | 4/2012 | Zhang et al. ............... 360/324.1 |
| 2001/0019786 | A1 | 9/2001 | Ikeda |

(Continued)

FOREIGN PATENT DOCUMENTS

| CN | 101023473 A | 8/2007 |
| JP | 2001-250223 A | 9/2001 |

(Continued)

OTHER PUBLICATIONS

Chinese Office Action issued in corresponding Application No. 200980147723.1 issued Apr. 28, 2013.

*Primary Examiner* — Kevin Bernatz
(74) *Attorney, Agent, or Firm* — Sughrue Mion, PLLC (57) ABSTRACT

A magnetic recording medium that is capable of realizing both high magnetic permeability and antiferromagnetic coupling for a soft magnetic underlayer. Namely, a magnetic recording medium including at least a non-magnetic substrate on which is laminated a soft magnetic underlayer formed by antiferromagnetic coupling of a plurality of soft magnetic layers, and a perpendicular magnetic layer for which the axis of easy magnetization is oriented mainly perpendicularly to the non-magnetic substrate, wherein the soft magnetic layers contain Fe as a first main component, Co as a second main component, and also contain Ta, the soft magnetic underlayer is antiferromagnetically coupled using the second peak or a subsequently appearing peak of the antiferromagnetic coupling force, which changes according to the thickness of a spacer layer sandwiched between the plurality of soft magnetic layers, and the magnetic permeability of the soft magnetic underlayer is not less than 1,000 H/m.

10 Claims, 2 Drawing Sheets (56) References Cited

U.S. PATENT DOCUMENTS

| | | |
|---|---|---|
| 2005/0118458 A1* | 6/2005 | Slaughter et al. .............. 428/692 |
| 2006/0093865 A1* | 5/2006 | Lim et al. ................... 428/828.1 |
| 2008/0124579 A1 | 5/2008 | Kaitsu et al. |
| 2008/0199734 A1* | 8/2008 | Ajan et al. .................... 428/828 |

FOREIGN PATENT DOCUMENTS

| | | |
|---|---|---|
| JP | 2001-331920 A | 11/2001 |
| JP | 2003-203326 A | 7/2003 |
| JP | 2008-135137 A | 6/2008 |
| JP | 2008-198316 A | 8/2008 |

\* cited by examiner

MAGNETIC RECORDING MEDIUM, MANUFACTURING METHOD THEREOF, AND MAGNETIC RECORDING/REPRODUCING DEVICE

TECHNICAL FIELD

The present invention relates to a magnetic recording medium and a manufacturing method thereof, and to a magnetic recording/reproducing device.

Priority is claimed on Japanese Patent Application No. 2008-306655, filed Dec. 1, 2008, the content of which is incorporated herein by reference.

BACKGROUND ART

The recording densities of hard disk devices (HDD), which represent one type of magnetic recording/reproducing device, are currently increasing at a rate of 50% or more every year, and it is said that this tendency is likely to continue. Accordingly, the development of magnetic heads and magnetic recording media suitable for these high recording densities also continues to progress.

Currently, the magnetic recording media installed within most commercially available magnetic recording/reproducing device are so-called perpendicular magnetic recording media in which the axis of easy magnetization within the magnetic film is mainly oriented perpendicularly. In these magnetic recording media, even when the recording density is increased, the effect of the demagnetizing field at the boundary region between recording bits is small, meaning a clear bit boundary is formed, and therefore any increase in the noise can be suppressed. Moreover, the reduction in the recording bit volume accompanying the increase in recording density can be kept to a minimum, meaning the medium is also resistant to the heat fluctuation effect. As a result, these magnetic recording media have been the focus of considerable attention in recent years, and many structures have been proposed for media that are suitable for perpendicular magnetic recording.

Further, in order to satisfy demands for even higher recording densities within magnetic recording media, the use of single-pole heads which exhibit excellent writing capabilities to perpendicular magnetic layers is also being investigated. In order to enable the use of these types of single-pole heads, so-called two-layer magnetic recording media have been proposed, in which, by providing a soft magnetic underlayer composed of a soft magnetic material between the perpendicular magnetic layer that functions as the recording layer and the non-magnetic substrate, the efficiency of the movement of magnetic flux between the single-pole head and the magnetic recording medium is improved.

In other words, in this type of two-layer magnetic recording medium, the mirror image effect of the soft magnetic underlayer has the function of strengthening the recording magnetic field from the main magnetic pole of the magnetic recording head, thereby spatially concentrating the recording magnetic field and increasing the gradient of the recording magnetic field.

However, simply using a magnetic recording medium in which a soft magnetic underlayer has been provided does not yield entirely satisfactory properties in terms of the recording and reproduction properties during recording and reproduction, the resistance to heat fluctuation and the recording resolution, and a magnetic recording medium that exhibits excellent levels of these properties is still sought.

For example, Patent Document 1 discloses a perpendicular magnetic recording medium in which a backing magnetic layer is provided on a non-magnetic substrate, and a perpendicular magnetic film and a protective lubricant film are then provided on the backing magnetic layer, wherein by antiferromagnetically coupling the backing magnetic layer, leaked magnetic flux emitted from the domain walls of the backing magnetic layer is prevented from entering the reproducing head, and the domain walls that exist within the backing magnetic layer are fixed to prevent easy movement, enabling a perpendicular magnetic recording medium with low noise characteristics to be obtained.

Further, Patent Document 2 discloses that by forming the soft magnetic layer from a plurality of layers and providing a separating layer between each of the soft magnetic layers, the magnetic permeability of the soft magnetic layer can be enhanced, and the leaked magnetic field from the magnetized transition region of the magnetic recording layer and the magnetic field from the magnetic head can be drawn into the soft magnetic layer, thereby enabling stabilization of the magnetization recorded within the magnetic recording layer and more effective extraction of the writing magnetic field from the magnetic head.

Patent Document 3 discloses a soft magnetic alloy in which $Fe:Co=65:35$, and also discloses the addition of Ta to this alloy.

CITATION LIST

Patent Documents

[Patent Document 1]
Japanese Unexamined Patent Application, First Publication No. 2001-331920
[Patent Document 2]
Japanese Unexamined Patent Application, First Publication No. 2001-250223
[Patent Document 3]
Japanese Unexamined Patent Application, First Publication No. 2008-135137

DISCLOSURE OF INVENTION

Problems to be Solved by the Invention

In a magnetic recording/reproducing device using the type of perpendicular magnetic recording medium described above, in order to prevent leaked magnetic flux emitted from the domain walls of the soft magnetic underlayer from entering the reproducing head, and fix the domain walls that exist within the soft magnetic underlayer to prevent easy movement, thereby producing low noise characteristics, the soft magnetic underlayer is preferably composed of a plurality of layers, and each of these layers is preferably antiferromagnetically coupled (hereinafter abbreviated as AFC).

On the other hand, in order to draw the leaked magnetic field from the magnetized transition region of the magnetic recording layer and the magnetic field from the magnetic head into the soft magnetic layer, thereby enabling stabilization of the magnetization recorded within the magnetic recording layer and more effective extraction of the writing magnetic field from the magnetic head, the magnetic permeability of the soft magnetic underlayer must be enhanced.

The conditions for performing AFC of the soft magnetic underlayer and the conditions for enhancing the magnetic permeability of the soft magnetic underlayer do not necessarily coincide. For example, in the structure disclosed in Patent Document 2, the magnetic permeability is enhanced by forming the soft magnetic underlayer from a plurality of layers, but this structure does not necessarily mean that the multilayer soft magnetic underlayer has undergone AFC.

The present invention has been developed in light of the current circumstances described above, and has an object of providing a magnetic recording medium that is capable of realizing both high magnetic permeability and antiferromagnetic coupling for a soft magnetic underlayer, a method of manufacturing the magnetic recording medium, and a magnetic recording/reproducing device that is equipped with this type of magnetic recording medium.

Means to Solve the Problems

The present invention includes the aspects described below.
(1) A magnetic recording medium including at least a non-magnetic substrate on which is laminated a soft magnetic underlayer formed by antiferromagnetic coupling of a plurality of soft magnetic layers, and a perpendicular magnetic layer for which the axis of easy magnetization is oriented mainly perpendicularly to the non-magnetic substrate, wherein
the soft magnetic layers contain Fe as a first main component, Co as a second main component, and also contain Ta, and
the soft magnetic underlayer is antiferromagnetically coupled using the second peak or a subsequently appearing peak of the antiferromagnetic coupling force, which changes according to the thickness of a spacer layer sandwiched between the plurality of soft magnetic layers, and the magnetic permeability of the soft magnetic underlayer is not less than 1,000 H/m.
(2) The magnetic recording medium according to (1) above, wherein the soft magnetic layers contain a Fe:Co ratio (atomic ratio) within a range from 60:40 to 70:30, and also contain 13 to 16 atomic % of Ta.
(3) The magnetic recording medium according to (1) or (2) above, wherein the soft magnetic underlayer is antiferromagnetically coupled using the second appearing peak of the antiferromagnetic coupling force.
(4) A method of manufacturing a magnetic recording medium including at least a non-magnetic substrate on which is laminated a soft magnetic underlayer formed by antiferromagnetic coupling of a plurality of soft magnetic layers and a perpendicular magnetic layer for which the axis of easy magnetization is oriented mainly perpendicularly to the non-magnetic substrate, the method including:
forming the soft magnetic layers containing Fe as a first main component and Co as a second main component, and also containing Ta,
forming the soft magnetic underlayer by performing antiferromagnetic coupling using the second peak or a subsequently appearing peak of the antiferromagnetic coupling force, which changes according to the thickness of a spacer layer sandwiched between the plurality of soft magnetic layers, to obtain a soft magnetic underlayer with a magnetic permeability of not less than 1,000 H/m, and
applying a negative bias within a range from −150 to −400 V to the non-magnetic substrate when forming the soft magnetic layer nearest to the perpendicular magnetic layer by sputtering.
(5) A magnetic recording/reproducing device, containing the magnetic recording medium according to any one of (1) to (3) above, or a magnetic recording medium manufactured by the method according to (4) above, and
a magnetic head that performs recording and reproduction of information to and from the magnetic recording medium.

Effect of the Invention

As described above, the present invention enables both a high magnetic permeability and antiferromagnetic coupling to be achieved for the soft magnetic underlayer, and therefore leaked magnetic flux emitted from the domain walls of the soft magnetic underlayer can be prevented from entering the reproducing head, and the domain walls that exist within the soft magnetic underlayer are fixed to prevent easy movement, enabling low noise characteristics to be obtained. Further, the leaked magnetic field from the magnetized transition region of the perpendicular magnetic layer and the magnetic field from the magnetic head are drawn sharply into the soft magnetic layer, thereby enabling stabilization of the magnetization recorded within the perpendicular magnetic layer and more effective extraction of the writing magnetic field from the magnetic head.

EMBODIMENTS FOR CARRYING OUT THE INVENTION

Detailed descriptions of the magnetic recording medium, the manufacturing method thereof and the magnetic recording/reproducing device according to the present invention are presented below with reference to the drawings.

In the drawings used in the following descriptions, in order to facilitate comprehension of the features of the present invention, those portions of the drawings that illustrate particular features may be enlarged for the sake of convenience, and therefore the dimensional ratios and the like between the various structural elements may not necessarily be the same as those found in the actual structures.

As a result of intensive investigation aimed at achieving the object described above, the inventors of the present invention discovered that by using a specific soft magnetic material, and antiferromagnetically coupling the soft magnetic underlayer under conditions different from those conditions that yield the strongest antiferromagnetic coupling, a combination of high magnetic permeability and antiferromagnetic coupling could be achieved for the soft magnetic underlayer, and they were therefore able to complete the present invention.

Figure 1:
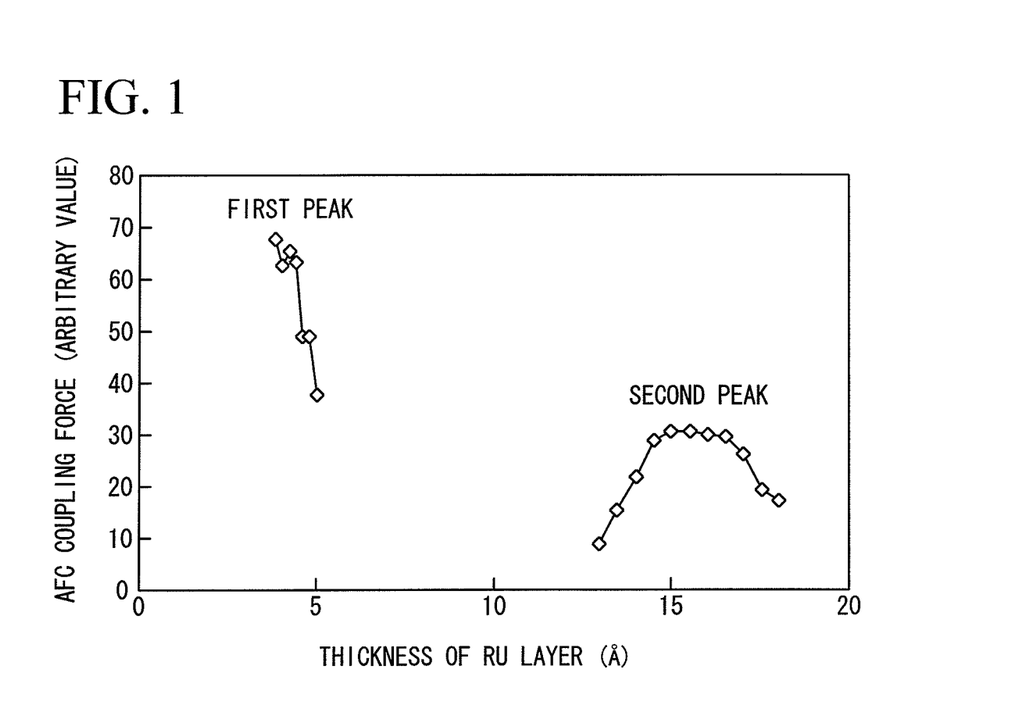
FIG. 1 is a characteristics diagram illustrating the relationship between the thickness of a Ru layer of the soft magnetic underlayer and the AFC force.

For example, the results of sandwiching a spacer layer formed from Ru between two soft magnetic layers composed of 55Fe-30Co-15Ta and then investigating the relationship between the thickness of the spacer layer and the AFC force of the soft magnetic layer are illustrated in FIG. 1. The 55Fe-30Co-15Ta alloy is an alloy having a Fe:Co ratio (atomic ratio) of 65:35 to which 15 atomic % of Ta has been added.

As illustrated in FIG. 1, the AFC force of the soft magnetic layer varies according to the thickness of the Ru layer, and as the Ru layer thickness is gradually increased, a first peak which yields the largest AFC force, a subsequent second peak, and a third peak which is not shown in the diagram appear.

In magnetic recording media, usually a soft magnetic underlayer is used that has undergone AFC under conditions corresponding with the first peak, but in the present invention, in order to enhance the magnetic permeability of the soft magnetic underlayer, a soft magnetic underlayer that has undergone AFC under conditions corresponding with the second peak or a subsequent peak is used.

As described above, there is no direct relationship between the AFC conditions for the soft magnetic layer and the magnetic permeability of the soft magnetic layer. In other words, strengthening the AFC of the soft magnetic layer does not necessarily enhance the magnetic permeability of the soft magnetic layer, but in contrast, weakening the AFC of the soft magnetic layer also does not necessarily enhance the magnetic permeability of the soft magnetic layer. As a result, in the soft magnetic underlayers of conventional magnetic recording media, only the achievement of superior AFC properties was considered, and no consideration was given to enhancing the magnetic permeability of the soft magnetic layer.

Accordingly, in the present invention, attention was focused on enhancing the magnetic permeability rather than increasing the AFC of the soft magnetic underlayer, and as a result, a magnetic recording medium is able to be provided which exhibits low noise characteristics, and which is capable of sharply drawing the leaked magnetic field from the magnetized transition region of the magnetic recording layer (the perpendicular magnetic layer) and the magnetic field from the magnetic head into the soft magnetic layer.

In other words, a magnetic recording medium according to the present invention has a basic structure including at least a non-magnetic substrate on which is laminated a soft magnetic underlayer formed by antiferromagnetic coupling of a plurality of soft magnetic layers, and a perpendicular magnetic layer for which the axis of easy magnetization is oriented mainly perpendicularly to the non-magnetic substrate, wherein the soft magnetic layers employ a CoFeTa-based alloy that contains Fe as a first main component, Co as a second main component, and also contains Ta. Moreover, the soft magnetic underlayer is antiferromagnetically coupled (AFC) using the second peak or a subsequently appearing peak of the antiferromagnetic coupling force, which changes according to the thickness of a spacer layer sandwiched between the plurality of soft magnetic layers, and as a result, the magnetic permeability of the soft magnetic underlayer is not less than 1,000 H/m.

Further, in the present invention, an alloy containing a Fe:Co ratio (atomic ratio) within a range from 60:40 to 70:30 and also containing 13 to 16 atomic % of Ta is preferably used as the soft magnetic layer. By employing an alloy with this type of composition, a soft magnetic underlayer can be obtained that combines a high magnetic permeability with a favorable AFC force.

Furthermore, in the present invention, the second appearing peak within the antiferromagnetic coupling force is preferably used for the antiferromagnetic coupling of the soft magnetic underlayer. This enables a combination of a high magnetic permeability and a favorable AFC force to be achieved.

Figure 2:
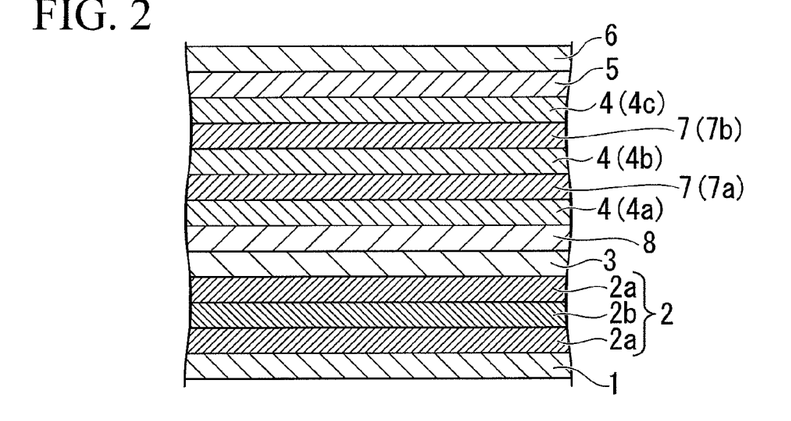
FIG. 2 is a cross-sectional view illustrating one example of a magnetic recording medium according to the present invention.

FIG. 2 is an illustration of one example of the magnetic recording medium according to the present invention.

As illustrated in FIG. 2, this magnetic recording medium has a structure containing a non-magnetic substrate 1 on which are sequentially laminated a soft magnetic underlayer 2 containing two soft magnetic layers 2a that have undergone AFC via a spacer layer 2b, an orientation control layer 3, a perpendicular magnetic layer 4, a protective layer 5, and a lubricant layer 6.

In this magnetic recording medium, the perpendicular magnetic layer 4 contains three layers, namely a lower magnetic layer 4a, a middle magnetic layer 4b and an upper magnetic layer 4c, arranged in sequence from the side of the non-magnetic substrate 1, and non-magnetic layers 7a and 7b are disposed between the lower magnetic layer 4a and the middle magnetic layer 4b, and between the middle magnetic layer 4b and the upper magnetic layer 4c respectively, yielding a laminated structure in which the magnetic layers 4a to 4c and the non-magnetic layers 7a and 7b are arranged in an alternating manner.

As the non-magnetic substrate 1, either a metal substrate formed from a metal material such as aluminum or an aluminum alloy may be used, or a non-metallic substrate formed from a non-metallic material such as glass, a ceramic, silicon, silicon carbide or carbon may be used. Further, a substrate prepared by using a plating method or sputtering method or the like to form an NiP layer or NiP alloy layer on the surface of one of the above metal substrates or non-metallic substrates can also be used.

An amorphous glass or crystallized glass or the like can be used as the glass substrate, and for example, general-purpose soda lime glass or aluminosilicate glass may be used. Further, a lithium-based crystallized glass or the like can be used as the crystallized glass. Examples of ceramic substrates that may be used include general-purpose aluminum oxide, sintered ceramics containing aluminum nitride or silicon nitride or the like as the main component, as well as fiber-reinforced versions of these substrates.

The average surface roughness (Ra) of the non-magnetic substrate 1 is typically not more than 2 nm (20 Å), and preferably not more than 1 nm, in terms of producing a magnetic recording medium that is suitable for a magnetic head having a low flying height. Further, the microwaviness (Wa) of the surface is typically not more than 0.3 nm (and more preferably 0.25 nm or less) in terms of producing a magnetic recording medium that is suitable for a magnetic head having a low flying height. Furthermore, using a substrate in which at least one of the chamfered portions of the end faces and the side surfaces have an average surface roughness (Ra) of not more than 10 nm (and preferably 9.5 nm or less) is preferable in terms of achieving favorable flying stability for the magnetic head. The microwaviness (Wa) can be measured, for example, using a surface roughness profiler P-12 (manufactured by KLM-Tencor Corporation), and is measured as the average surface roughness across a measurement range of 80 μm.

Further, because the non-magnetic substrate 1 contacts the soft magnetic underlayer 2 that contains Co and Fe as main components, the effects of adsorbed gas or moisture at the substrate surface, or diffusion of the substrate components may cause corrosion to occur. In such cases, an adhesive layer is preferably provided the non-magnetic substrate 1 and the soft magnetic underlayer 2, and this type of adhesive layer can suppress the types of corrosion problems mentioned above. The material used for the adhesive layer may be selected appropriately from among Cr, Cr alloys, Ti and Ti alloys and the like. The thickness of the adhesive layer is preferably at least 2 nm (30 Å).

As described above, the soft magnetic underlayer 2 contains Fe as a first main component, Co as a second main component, and also contains Ta. Further, the soft magnetic underlayer 2 is antiferromagnetically coupled using the second peak or a subsequently appearing peak of the antiferromagnetic coupling force, which varies according to the thickness of the spacer layer 2b sandwiched between the plurality of soft magnetic layers 2a. Moreover, the magnetic permeability of the soft magnetic underlayer 2 is preferably not less than 1,000 H/m, and is more preferably within a range from 1,000 to 3,000 H/m.

As the soft magnetic layers 2a of the soft magnetic underlayer 2, the use of an alloy containing a Fe:Co (atomic ratio) within a range from 60:40 to 70:30 and also containing 13 to 16 atomic % of Ta is preferred. Further, the antiferromagnetic coupling of the soft magnetic underlayer 2 is preferably performed using the second appearing peak of the antiferromagnetic coupling force.

In addition to the Fe, Co and Ta, the material for the soft magnetic underlayer 2 may also include not more than 10 atomic % of one or more elements selected from amongst Zr, Nb, Cr and Mo and the like. These added elements may be added as appropriate for the purpose of further enhancing the magnetic permeability of the soft magnetic underlayer 2.

The coercive force Hc of the soft magnetic underlayer 2 is preferably not more than 100 [Oe] (and more preferably not more than 20 [Oe]). 1 [Oe] represents a value of 79 A/m. If the coercive force Hc exceeds the above limit, then the soft magnetic properties tend to be inadequate, and the reproduction waveform tends to change from a so-called square wave to a less desirable waveform that includes distortions.

The saturation magnetic flux density Bs of the soft magnetic underlayer 2 is preferably not less than 0.6 T (and is more preferably 1 T or greater). If this value of Bs is less than the above limit, then the reproduction waveform tends to change from a so-called square wave to a less desirable waveform that includes distortions.

The arithmetic product Bs·t (T·nm) of the saturation magnetic flux density Bs (T) of the soft magnetic underlayer 2 and the thickness t (nm) of the soft magnetic underlayer 2 is preferably at least 15 T·nm (and more preferably 25 T·nm or higher). If this value of Bs·t is less than the above limit, then the reproduction waveform tends to develop distortions, and the OW (OverWrite) properties (recording properties) tend to deteriorate.

The soft magnetic underlayer 2 is composed of two or more soft magnetic layers, and a Ru film is preferably provided as a spacer layer 2b between each of the soft magnetic layers 2a. If the thickness of the Ru film is approximately 5 Å or less, then the strongest AFC will occur, so in those cases where, as in the present invention, the second appearing peak of the antiferromagnetic coupling force is to be used, the thickness of the Ru film is preferably within a range from approximately 13 to 18 Å.

In the present invention, when the upper soft magnetic layer 2a (on the side of the perpendicular magnetic layer 4) is deposited by sputtering, a negative bias within a range from −150 to −400 V is preferably applied to the non-magnetic substrate 1. By applying a negative bias to the non-magnetic substrate 1, the Ru or the like of the spacer layer 2b diffuses slightly into the soft magnetic layer 2a, thereby strengthening the coupling of the two soft magnetic layers 2a, and achieving more stable AFC.

At the uppermost surface of the soft magnetic underlayer 2 (the surface adjacent to the orientation control layer 3), the material that constitutes the soft magnetic underlayer 2 is preferably partially or completely oxidized. For example, at the surface of the soft magnetic underlayer 2 (the surface adjacent to the orientation control layer 3) and within the immediate vicinity thereof, the material that constitutes the soft magnetic underlayer 2 is preferably either partially oxidized, or an oxide of the material has been formed. This enables magnetic fluctuations at the surface of the soft magnetic underlayer 2 to be suppressed, thereby reducing noise that is caused by such magnetic fluctuations, and improving the recording and reproduction properties of the magnetic recording medium.

The orientation control layer 3 formed on top of the soft magnetic underlayer 2 can reduce the crystal grain size of the perpendicular magnetic layer 4, thereby improving the recording and reproduction properties. Although there are no particular limitations on the material for this layer, a material having an hcp structure, fcc structure or amorphous structure is preferred. Ru-based alloys, Ni-based alloys, Co-based alloys, Pt-based alloys and Cu-based alloys are particularly desirable, and multilayering of these alloys is also possible. For example, the use of a multilayer structure composed of a Ni-based alloy and a Ru-based alloy, a multilayer structure composed of a Co-based alloy and a Ru-based alloy, or a multilayer structure composed of a Pt-based alloy and a Ru-based alloy, wherein the former alloy is disposed on the substrate-side of the medium in each case, is particularly desirable.

For example, in the case of a Ni-based alloy, an alloy composed of at least one material selected from amongst NiW alloys, NiTa alloys, NiNb alloys, NiTi alloys, NiZr alloys, NiMn alloys and NiFe alloys which contain from 33 to 96 at % of Ni is preferred. Further, a non-magnetic material containing 33 to 96 at % of Ni, and also containing one or more elements selected from amongst Sc, Y, Ti, Zr, Hf, Nb, Ta and C may also be used. In this case, in order to ensure that the effect of the orientation control layer 3 is maintained while satisfying the range that ensures no magnetism, the Ni content is preferably within a range from 33 to 96 at %.

In the magnetic recording medium of this embodiment, the thickness of the orientation control layer 3, or the total thickness in the case of a multilayer structure, is preferably within a range from 5 to 40 nm (and more preferably from 8 to 30 nm). When the thickness of the orientation control layer 3 satisfies the above range, the perpendicular orientation of the perpendicular magnetic layer 4 is particularly superior, and the distance between the magnetic head and the soft magnetic underlayer 2 during recording can be reduced, thereby enabling the recording and reproduction properties to be enhanced without lowering the resolution of the reproduction signal.

On the other hand, if the thickness of the orientation control layer 3 is less than the above-mentioned range, then the perpendicular orientation within the perpendicular magnetic layer 4 tends to deteriorate, meaning the recording and reproduction properties and the resistance to heat fluctuation also tend to deteriorate. Further, if the thickness of the orientation control layer 3 exceeds the above range, then the size of the magnetic grains within the perpendicular magnetic layer 4 tends to increase, and there is a possibility of an undesirable deterioration in the noise characteristics. Furthermore, the distance between the magnetic head and the soft magnetic underlayer 2 during recording increases, which causes an undesirable deterioration in the resolution of the reproduction signal and a reduction in the reproduction output.

The surface shape of the orientation control layer 3 affects the surface shape of the perpendicular magnetic layer 4 and the protective layer 5, and therefore in order to reduce surface unevenness within the magnetic recording medium and enable the flying height of the magnetic head to be lowered during recording and reproduction, the average surface roughness Ra of the orientation control layer 3 is preferably not more than 2 nm. This reduces unevenness at the surface of the magnetic recording medium, and enables the magnetic head flying height to be lowered satisfactorily during recording and reproduction, meaning the recording density can be increased.

Oxygen or nitrogen or the like may be introduced into the gas used for deposition of the orientation control layer 3. For example, if a sputtering method is used as the deposition method, then a mixed gas composed of argon containing 0.05 to 50% (and preferably 0.1 to 20%) by volume of oxygen, or a mixed gas composed of argon containing 0.01 to 20% (and preferably 0.02 to 10%) by volume of nitrogen can be used favorably as the process gas.

Further, the orientation control layer 3 may have a structure in which metal particles are dispersed within an oxide, a metal nitride or a metal carbide. In order to prepare this type of structure, an alloy material containing the oxide, metal nitride or metal carbide is preferably used. Specific examples of oxides that may be used include $SiO_2$, $Al_2O_3$, $Ta_2O_5$, $Cr_2O_3$, MgO, $Y_2O_3$ and $TiO_2$, examples of metal nitrides that may be used include AlN, $Si_3N_4$, TaN and CrN, and examples of metal carbides that may be used include TaC, BC and SiC. Moreover, materials such as NiTa—$SiO_2$, RuCo—$Ta_2O_5$, Ru—$SiO_2$, Pt—$Si_3N_4$ or Pd—TaC may also be used.

The amount of the oxide, metal nitride or metal carbide within the orientation control layer 3, relative to the alloy, is preferably not less than 1 mol % and not more than 12 mol %. If the amount of the oxide, metal nitride or metal carbide within the orientation control layer 3 exceeds the above range, then residual oxide, metal nitride or metal carbide tends to be retained within the metal grains, which not only causes a loss in the crystallinity and orientation of the metal grains, but may also cause an undesirable deterioration in the crystallinity and orientation of the magnetic layer formed on top of the orientation control layer 3. In contrast, if the amount of the oxide, metal nitride or metal carbide within the orientation control layer 3 is less than the above range, then the effects obtained by adding the oxide, metal nitride or metal carbide tend not be obtained, which is also undesirable.

Further, a non-magnetic underlayer 8 is preferably provided between the orientation control layer 3 and the perpendicular magnetic layer 4. The initial portions of perpendicular magnetic layer 4 formed immediately on top of the orientation control layer 3 tend to be prone to disturbed crystal growth, which can cause noise. By substituting this initial disturbed portion with the non-magnetic underlayer 8, the occurrence of noise can be suppressed.

The non-magnetic underlayer 8 is preferably composed of a material that contains Co as the main component, and also contains an oxide 41. The Cr content is preferably not less than 25 at % (atomic %) and not more than 50 at %. As the oxide 41, the use of an oxide of Cr, Si, Ta, Al, Ti, Mg or Co or the like is preferable, and of these, the use of $TiO_2$, $Cr_2O_3$ or $SiO_2$ or the like is particularly desirable. The amount of the oxide, relative to the total number of mols of the alloy compound that constitutes the magnetic grains, wherein the alloy of Co, Cr and Pt and the like is calculated as a single compound, is preferably not less than 3 mol % and not more than 18 mol %.

Further, the non-magnetic underlayer 8 is preferably composed of a composite oxide containing two or more added oxides. Of such composite oxides, $Cr_2O_3$—$SiO_2$, $Cr_2O_3$—$TiO_2$ and $Cr_2O_3$—$SiO_2$—$TiO_2$ are particularly desirable. Moreover, CoCr—$SiO_2$, CoCr—$TiO_2$, CoCr—$Cr_2O_3$—$SiO_2$, CoCr—$TiO_2$—$Cr_2O_3$ and CoCr—$Cr_2O_3$—$TiO_2$—$SiO_2$ and the like can also be used favorably. Furthermore, Pt may be added in terms of achieving favorable crystal growth.

The thickness of the non-magnetic underlayer 8 is preferably not less than 0.2 nm and not more than 3 nm. If the thickness exceeds 3 nm, then Hc and Hn tend to decrease, which is undesirable.

The magnetic layer 4a is composed of a material that contains Co as the main component and also contains the oxide 41. As the oxide 41, the use of an oxide of Cr, Si, Ta, Al, Ti, Mg or Co or the like is preferable. Of these, the use of $TiO_2$, $Cr_2O_3$ or $SiO_2$ or the like is particularly desirable. Further, the magnetic layer 4a preferably contains a composite oxide containing two or more added oxides. Of such composite oxides, $Cr_2O_3$—$SiO_2$, $Cr_2O_3$—$TiO_2$ and $Cr_2O_3$—$SiO_2$—$TiO_2$ are particularly desirable.

Figure 3:
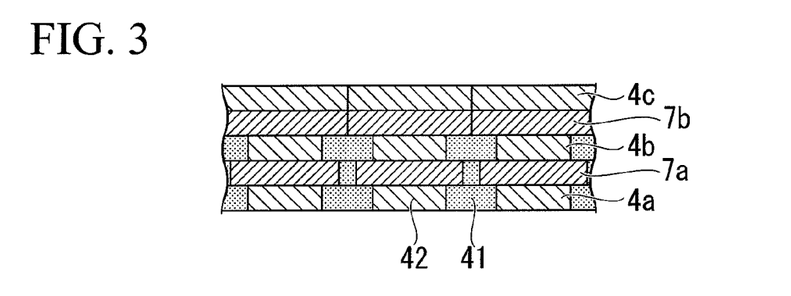
FIG. 3 is a cross-sectional view illustrating an enlargement of the laminated structure of a magnetic layer and a non-magnetic layer.

In the magnetic layer 4a, magnetic grains (crystal grains that exhibit magnetism) 42 are preferably dispersed within the layer. Further, as illustrated in FIG. 3, these magnetic grains 42 preferably form columnar structures which penetrate vertically through the magnetic layers 4a and 4b and the magnetic layer 4c. By adopting this type of structure, the orientation and crystallinity of the magnetic grains 42 within the magnetic layer 4a can be improved, which results in a signal-to-noise ratio (S/N ratio) that is ideal for high-density recording.

In order to obtain this type of structure, the amount of the oxide 41 incorporated within the layer and the deposition conditions employed for the magnetic layer 4a are very important. In other words, the amount of the oxide 41, relative to the total number of mols of the alloy compound that constitutes the magnetic grains 42, wherein the alloy of Co, Cr and Pt and the like is calculated as a single compound, is preferably not less than 3 mol % and not more than 18 mol %. This amount of the oxide 41 is more preferably not less than 6 mol % and not more than 13 mol %.

The reason that the amount of the oxide 41 within the magnetic layer 4a preferably satisfies the above-mentioned range is because such an amount enables the oxide 41 to be deposited around the magnetic grains 42 during formation of the magnetic layer 4a, thereby enabling superior isolation and miniaturization of the magnetic grains 42. On the other hand, if the amount of the oxide 41 exceeds the above range, then the oxide 41 tends to be retained within the magnetic grains 42, which causes a loss in the orientation and crystallinity of the magnetic grains 42, and the oxide 41 may also be deposited above and below the magnetic grains 42, which prevents the magnetic grains 42 from forming the columnar structures which penetrate vertically through the magnetic layers 4a to 4c. Furthermore, if the amount of the oxide 41 is less than the above range, then the resulting isolation and miniaturization of the magnetic grains 42 tend to be inadequate, which results in increased noise during recording and reproduction, and makes it impossible to obtain a signal-to noise ratio (S/N ratio) that is suitable for high-density recording.

The amount of Cr within the magnetic layer 4a is preferably not less than 4 at % and not more than 19 at % (and preferably not less than 6 at % and not more than 17 at %). The reason for specifying an amount of Cr that satisfies the above range is because such an amount does not cause an excessively large reduction in the magnetic anisotropy constant Ku of the magnetic grains 42 and retains a high level of magnetization, meaning recording and reproduction properties that are suited to high-density recording and satisfactory heat fluctuation properties can be obtained.

On the other hand, if the amount of Cr exceeds the above range, then the magnetic anisotropy constant Ku of the magnetic grains 42 tends to decrease, causing a deterioration in the heat fluctuation properties, and the crystallinity and orientation of the magnetic grains 42 also tend to deteriorate, resulting in an undesirable worsening of the recording and reproduction properties. Further, if the amount of Cr is less than the above range, then because the magnetic anisotropy constant Ku of the magnetic grains 42 is very high, the perpendicular coercive force tends to become too high, and therefore the magnetic head is unable to achieve satisfactory writing when recording data, meaning the overwrite properties (OW) are not appropriate for high-density recording.

The amount of Pt within the magnetic layer 4a is preferably not less 8 at % and not more than 20 at %. The reason for specifying an amount of Pt that satisfies the above range is because if the amount of Pt is less than 8 at %, then the magnetic anisotropy constant Ku required by the perpendicular magnetic layer 4 decreases. In contrast, if the amount of Pt exceeds 20 at %, then stacking faults tend to occur within the interior of the magnetic grains 42, causing a reduction in the magnetic anisotropy constant Ku. Accordingly, in order to ensure heat fluctuation properties and recording and reproduction properties that are ideal for high-density recording, the amount of Pt preferably satisfies the range mentioned above.

Furthermore, if the amount of Pt exceeds the range mentioned above, then fcc structure layers tend to form within the magnetic grains 42, which can cause a deterioration in the crystallinity and orientation and is therefore undesirable. On the other hand, if the amount of Pt is less than the above range, then the magnetic anisotropy constant Ku necessary for obtaining heat fluctuation properties suitable for high-density recording tends to be unobtainable.

In addition to Co, Cr, Pt and the oxide 41, the magnetic layer 4a may also contain one or more elements selected from amongst B, Ta, Mo, Cu, Nd, W, Nb, Sm, Tb, Ru and Re. Including one or more of these elements promotes miniaturization of the magnetic grains 42 and can also improve the crystallinity and orientation, enabling recording and reproduction properties and heat fluctuation properties that are better suited to high-density recording to be obtained.

The total amount of the above-mentioned elements is preferably not more than 8 at %. If this amount exceeds 8 at %, then phases other than the hcp phase tend to form within the magnetic grains 42, which disturbs the crystallinity and orientation of the magnetic grains 42, making it difficult to obtain recording and reproduction properties and heat fluctuation properties that are suitable for high-density recording.

Examples of materials that are suitable for the magnetic layer 4a include 90(Co14Cr18Pt)-10($SiO_2$) {wherein the molar concentration of crystal grains composed of Cr: 14 at %, Pt: 18 at % and Co: the remainder, which are calculated as a single compound, is 90 mol %, and the concentration of oxide compositions composed of $SiO_2$ is 10 mol %}, 92(Co10Cr16Pt)-8($SiO_2$), and 94(Co8Cr14Pt4Nb)-6($Cr_2O_3$), as well as (CoCrPt)—($Ta_2O_5$), (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtMo)—(TiO), (CoCrPtW)—($TiO_2$), (CoCrPtB)—($Al_2O_3$), (CoCrPtTaNd)—(MgO), (CoCrPtBCu)—($Y_2O_3$), and (CoCrPtRu)—($SiO_2$).

The magnetic layer 4b is preferably composed of a material that contains Co as the main component and also contains an oxide 41. As the oxide 41, the use of an oxide of Cr, Si, Ta, Al, Ti, Mg or Co or the like is preferable. Of these, the use of $TiO_2$, $Cr_2O_3$ or $SiO_2$ or the like is particularly desirable. Further, the magnetic layer 4b preferably contains a composite oxide containing two or more added oxides. Of such composite oxides, $Cr_2O_3$—$SiO_2$, $Cr_2O_3$—$TiO_2$ and $Cr_2O_3$—$SiO_2$—$TiO_2$ are particularly desirable.

In the magnetic layer 4b, magnetic grains (crystal grains that exhibit magnetism) 42 are preferably dispersed within the layer. Further, as illustrated in FIG. 3, these magnetic grains 42 preferably form columnar structures which penetrate vertically through the magnetic layers 4a and 4b and the magnetic layer 4c. By forming this type of structure, the orientation and crystallinity of the magnetic grains 42 within the magnetic layer 4b can be improved, which results in a signal-to-noise ratio (S/N ratio) that is ideal for high-density recording.

The amount of the oxide 41 within the magnetic layer 4b, relative to the total amount of the compound of Co, Cr and Pt and the like that constitutes the magnetic grains 42, is preferably not less than 3 mol % and not more than 18 mol %. This amount of the oxide 41 is more preferably not less than 6 mol % and not more than 13 mol %.

The reason that the amount of the oxide 41 within the magnetic layer 4b preferably satisfies the above-mentioned range is because such an amount enables the oxide 41 to be deposited around the magnetic grains 42 during formation of the magnetic layer 4b, thereby enabling superior isolation and miniaturization of the magnetic grains 42. On the other hand, if the amount of the oxide 41 exceeds the above range, then the oxide 41 tends to be retained within the magnetic grains 42, which causes a loss in the orientation and crystallinity of the magnetic grains 42, and the oxide 41 may also be deposited above and below the magnetic grains 42, which prevents the magnetic grains 42 from forming the columnar structures which penetrate vertically through the magnetic layers 4a to 4c. Furthermore, if the amount of the oxide 41 is less than the above range, then the resulting isolation and miniaturization of the magnetic grains 42 tend to be inadequate, which results in increased noise during recording and reproduction, and makes it impossible to obtain a signal-to noise ratio (S/N ratio) that is suitable for high-density recording.

The amount of Cr within the magnetic layer 4b is preferably not less than 4 at % and not more than 18 at % (and preferably not less than 8 at % and not more than 15 at %). The reason for specifying an amount of Cr that satisfies the above range is because such an amount does not cause an excessively large reduction in the magnetic anisotropy constant Ku of the magnetic grains 42 and retains a high level of magnetization, meaning recording and reproduction properties that are suited to high-density recording and satisfactory heat fluctuation properties can be obtained.

On the other hand, if the amount of Cr exceeds the above range, then the magnetic anisotropy constant Ku of the magnetic grains 42 tends to decrease, causing a deterioration in the heat fluctuation properties, and the crystallinity and orientation of the magnetic grains 42 also tend to deteriorate, resulting in an undesirable worsening of the recording and reproduction properties. Further, if the amount of Cr is less than the above range, then because the magnetic anisotropy constant Ku of the magnetic grains 42 is very high, the perpendicular coercive force tends to become too high, and therefore the magnetic head is unable to achieve satisfactory writing when recording data, meaning the overwrite properties (OW) are not appropriate for high-density recording.

The amount of Pt within the magnetic layer 4b is preferably not less 10 at % and not more than 22 at %. The reason for specifying an amount of Pt that satisfies the above range is because if the amount of Pt is less than 10 at %, then the magnetic anisotropy constant Ku required by the perpendicular magnetic layer 4 decreases. In contrast, if the amount of Pt exceeds 22 at %, then stacking faults tend to occur within the interior of the magnetic grains 42, causing a reduction in the magnetic anisotropy constant Ku. In order to ensure heat fluctuation properties and recording and reproduction properties that are suitable for high-density recording, the amount of Pt preferably satisfies the range mentioned above.

Furthermore, if the amount of Pt exceeds the range mentioned above, then fcc structure layers tend to form within the magnetic grains 42, which can cause a deterioration in the crystallinity and orientation and is therefore undesirable. On the other hand, if the amount of Pt is less than the above range, then the magnetic anisotropy constant Ku necessary for obtaining heat fluctuation properties suitable for high-density recording tends to be unobtainable.

In addition to Co, Cr, Pt and the oxide 41, the magnetic layer 4b may also contain one or more elements selected from amongst B, Ta, Mo, Cu, Nd, W, Nb, Sm, Tb, Ru and Re. Including one or more of these elements promotes miniaturization of the magnetic grains 42 and can also improve the crystallinity and orientation, enabling recording and reproduction properties and heat fluctuation properties that are better suited to high-density recording to be obtained.

The total amount of the above-mentioned elements is preferably not more than 8 at %. If this amount exceeds 8 at %, then phases other than the hcp phase tend to form within the magnetic grains 42, which disturbs the crystallinity and orientation of the magnetic grains 42, making it difficult to obtain recording and reproduction properties and heat fluctuation properties that are suitable for high-density recording.

The magnetic layer 4c is preferably composed of a material that contains Co as the main component but contains no oxide. As illustrated in FIG. 3C, the magnetic grains 42 within the layer preferably have a structure that represents columnar epitaxial growth from the magnetic grains 42 within the magnetic layer 4a. In this case, the magnetic grains 42 of the magnetic layers 4a to 4c preferably undergo columnar epitaxial growth in a 1:1 ratio within each layer. Further, because the magnetic grains 42 of the magnetic layer 4b grow epitaxially from the magnetic grains 42 within the magnetic layer 4a, the magnetic grains 42 of the magnetic layer 4b are miniaturized, enabling further improvements in the crystallinity and orientation.

The amount of Cr within the magnetic layer 4c is preferably not less than 10 at % and not more than 24 at %. The reason for specifying an amount of Cr that satisfies the above range is because such an amount enables a satisfactory output to be ensured during data reproduction, and also yields favorable heat fluctuation properties. In contrast, if the amount of Cr exceeds the above range, then the magnetization of the magnetic layer 4c tends to become too small, which is undesirable. Further, if the amount of Cr is less than the above range, then the resulting isolation and miniaturization of the magnetic grains 42 tend to be inadequate, which results in increased noise during recording and reproduction, and makes it impossible to obtain a signal-to noise ratio (S/N ratio) that is suitable for high-density recording.

Further, the magnetic layer 4c may be composed of a material that contains Pt in addition to the Co and Cr. The amount of Pt within the magnetic layer 4c is preferably not less 8 at % and not more than 20 at %. Provided the amount of Pt satisfies the above range, a satisfactory coercive force that is ideal for high recording densities can be obtained, and a high reproduction output can be maintained during recording and reproduction, resulting in recording and reproduction properties and heat fluctuation properties that are suitable for high-density recording.

In contrast, if the amount of Pt exceeds the range mentioned above, then a phase having an fcc structure tends to form within the magnetic layer 4c, which can cause a deterioration in the crystallinity and orientation and is therefore undesirable. Further, if the amount of Pt is less than the above range, then the magnetic anisotropy constant Ku necessary for obtaining heat fluctuation properties suitable for high-density recording tends to be unobtainable.

In addition to Co, Cr and Pt, the magnetic layer 4c may also contain one or more elements selected from amongst B, Ta, Mo, Cu, Nd, W, Nb, Sm, Tb, Ru, Re and Mn. Including one or more of these elements promotes miniaturization of the magnetic grains 42 and can also improve the crystallinity and orientation, enabling recording and reproduction properties and heat fluctuation properties that are better suited to high-density recording to be obtained.

The total amount of the above-mentioned elements is preferably not more than 16 at %. If this amount exceeds 16 at %, then phases other than the hcp phase tend to form within the magnetic grains 42, which disturbs the crystallinity and orientation of the magnetic grains 42, making it difficult to obtain recording and reproduction properties and heat fluctuation properties that are suitable for high-density recording.

Examples of materials that are particularly suitable for the magnetic layer 4c include CoCrPt-based materials and CoCrPtB-based materials. In the case of CoCrPtB-based materials, the combined amount of Cr and B is preferably not less than 18 at % and not more than 28 at %.

As the materials suitable for the magnetic layer 4c, CoCrPt-based materials such as Co14~24Cr8~22Pt {Cr content: 14 to 24 at %, Pt content: 8 to 22 at %, Co content: remainder} and CoCrPtB-based materials such as Co10~24Cr8~22Pt0~16B {Cr content: 10 to 24 at %, Pt content: 8 to 22 at %, B content: 0 to 16 at %, Co content: remainder} are preferred. Examples of other materials include CoCrPtTa-based materials such as Co10~24Cr8~22Pt1~5Ta {Cr content: 10 to 24 at %, Pt content: 8 to 22 at %, Ta content: 1 to 5 at %, Co content: remainder} and CoCrPtTaB-based materials such as Co10~24Cr8~22Pt1~5Ta1~10B {Cr content: 10 to 24 at %, Pt content: 8 to 22 at %, Ta content: 1 to 5 at %, B content: 1 to 10 at %, Co content: remainder}, as well as CoCrPtBNd-based materials, CoCrPtTaNd-based materials, CoCrPtNb-based materials, CoCrPtBW-based materials, CoCrPtMo-based materials, CoCrPtCuRu-based materials and CoCrPtRe-based materials.

The perpendicular coercive force (Hc) of the perpendicular magnetic layer 4 is preferably 3,000 [Oe] or greater. If the coercive force is less than 3,000 [Oe], then the recording and reproduction properties, and particularly the frequency characteristics, tend to deteriorate, and the heat fluctuation properties also worsen, meaning the medium is undesirable as a high-density recording medium.

The reverse magnetic domain generating magnetic field (−Hn) of the perpendicular magnetic layer 4 is preferably 1,500 [Oe] or greater. If the reverse magnetic domain generating magnetic field (−Hn) is less than 1,500 [Oe], then the resistance to heat fluctuation deteriorates.

In the perpendicular magnetic layer 4, the average grain size of the magnetic grains is preferably within a range from 3 to 12 nm. This average grain size can be determined, for example, by observing the perpendicular magnetic layer 4 using a TEM (transmission electron microscope), and then subjecting the observed image to image processing.

The thickness of the perpendicular magnetic layer 4 is preferably within a range from 5 to 20 nm. If the thickness of the perpendicular magnetic layer 4 is less than this range, then a satisfactory reproduction output is unobtainable, and the heat fluctuation properties tend to deteriorate. Further, if the thickness of the perpendicular magnetic layer 4 exceeds the above range, then the magnetic grains within the perpendicular magnetic layer 4 tend to become more coarse, and the noise during recording and reproduction tends to increase, meaning the recording and reproduction properties typified by the signal-to noise ratio (S/N ratio) and the overwrite (OW) properties tend to deteriorate undesirably.

The protective layer 5 prevents corrosion of the perpendicular magnetic layer 4, and also prevents damage to the surface of the medium when the magnetic head makes contact with the medium. Conventional materials can be used for the protective layer 5, and for example, materials containing C, $SiO_2$ or $ZrO_2$ can be used. Setting the thickness of the protective layer 5 to a value within a range from 1 to 10 nm enables the distance between the head and the medium to be minimized, which is preferred in terms of achieving high-density recording.

For the lubricant layer 6, a lubricant such as a perfluoropolyether, a fluorinated alcohol, or a fluorinated carboxylic acid or the like is preferably used.

In the present invention, it is preferable that the magnetic layer on the side of the non-magnetic substrate 1 is formed as a magnetic layer with a granular structure, whereas the magnetic layer on the side of the protective layer 5 is formed as a magnetic layer with a non-granular structure that contains no oxide. By employing this type of configuration, the various properties of the magnetic recording medium such as the heat fluctuation properties, the overwrite (OW) properties and the S/N ratio and the like can be more easily controlled and adjusted.

Further, in the present invention, the perpendicular magnetic layer 4 described above may also be formed of four or more magnetic layers. For example, in addition to the magnetic layers 4a and 4b described above, a third magnetic layer with a granular structure may be provided, with the magnetic layer 4c containing no oxide provided on top of this third magnetic layer. Alternatively, the magnetic layer 4c containing no oxide may be formed as a two-layer structure, which is provided on top of the magnetic layers 4a and 4b.

Further, in the present invention, a non-magnetic layer 7 (illustrated by symbols 7a and 7b in FIG. 2) is preferably provided between the three or more magnetic layers that constitute the perpendicular magnetic layer 4. Providing a non-magnetic layer 7 of an appropriate thickness facilitates magnetization reversal of each of the films, and enables a reduction in the dispersion of magnetization reversal across all of the magnetic grains. As a result, the S/N ratio can be further improved.

In other words, the thickness of the non-magnetic layer 7 is preferably within a range that does not totally block magnetostatic coupling between each of the layers that constitute the perpendicular magnetic layer 4, and specifically, is preferably not less than 0.1 nm and not more than 2 nm (and more preferably not less than 0.1 nm and not more than 0.8 nm).

The three or more magnetic layers 4a of the present invention are ferromagnetically coupled (hereinafter also abbreviated as FC), and when the magnetostatic coupling is cut completely, the M-H loop becomes a loop that reverses in two stages, which can be readily discerned. When this two-stage loop occurs, it means that the magnetic grains do not reverse all together under the effect of the magnetic field from the magnetic head, and as a result, the S/N ratio during reproduction worsens markedly, and the resolution also deteriorates, both of which are undesirable.

In those cases where Ru or a Ru alloy is used, AFC occurs for thickness values of not less than 0.6 nm and not more than 1.2 nm. In the present invention, each of the magnetic layers 4a must be coupled not by AFC, but magnetostatically coupled by FC.

As the non-magnetic layer 7 provided between the magnetic layers that constitute the perpendicular magnetic layer 4, the use of a material having an hcp structure is preferred. Examples of materials that can be used favorably include Ru, Ru alloys, CoCr alloys, and $CoCrX_1$ alloys (wherein $X_1$ represents one or more elements selected from amongst Pt, Ta, Zr, Re, Ru, Cu, Nb, Ni, Mn, Ge, Si, O, N, W, Mo, Ti, V, Zr and B).

In those cases where a CoCr-based alloy is used as the non-magnetic layer 7 provided between the magnetic layers that constitute the perpendicular magnetic layer 4, the Co content of the alloy is preferably within a range from 30 to 80 at %. Provided the Co content is within this range, coupling between the magnetic layers can be adjusted to a small value.

Further, when an alloy having an hcp structure is used as the non-magnetic layer 7 provided between the magnetic layers that constitute the perpendicular magnetic layer 4, then besides Ru, alloys of Ru, Re, Ti, Y, Hf or Zn or the like may also be used.

Furthermore, as the non-magnetic layer 7 provided between the magnetic layers that constitute the perpendicular magnetic layer 4, metals and alloys that adopt a different structure may also be used, provided they do not impair the crystallinity and orientation of the magnetic layers positioned above and below the non-magnetic layer 7. Specific examples of these other metals and alloys include metals such as Pd, Pt, Cu, Ag, Au, Ir, Mo, W, Ta, Nb, V, Bi, Sn, Si, Al, C, B and Cr, and alloys thereof. In the case of Cr alloys, the use of alloys represented by $CrX_2$ (wherein $X_2$ represents one or more elements selected from amongst Ti, W, Mo, Nb, Ta, Si, Al, B, C and Zr) is particularly desirable, and the Cr content of such alloys is preferably not less than 60 at %.

Furthermore, as the non-magnetic layer 7 provided between the magnetic layers that constitute the perpendicular magnetic layer 4, it is preferable to employ a structure in which metal particles of the above-mentioned alloy are dispersed within an oxide, metal nitride or metal carbide. Moreover, it is particularly desirable that these metal particles have a columnar structure that penetrates vertically through the nonmagnetic layer 7. In order to produce this type of structure, an alloy material containing an oxide, metal nitride or metal carbide is preferably used. Specific examples of the oxide include $SiO_2$, $Al_2O_3$, $Ta_2O_5$, $Cr_2O_3$, MgO, $Y_2O_3$ and $TiO_2$, specific examples of the metal nitrides include AlN, $Si_3N_4$, TaN and CrN, and specific examples of the metal carbides include TaC, BC and SiC. Hence, examples of materials that can be used for the non-magnetic layer 7 include CoCr—$SiO_2$, CoCr—$TiO_2$, CoCr—$Cr_2O_3$, CoCrPt—$Ta_2O_5$, Ru—$SiO_2$, Ru—$Si_3N_4$ and Pd—TaC.

The amount of the oxide, metal nitride or metal carbide within the non-magnetic layer 7 provided between the magnetic layers that constitute the perpendicular magnetic layer 4 is preferably an amount that does not impair the crystal growth or crystal orientation of the perpendicular magnetic layer. More specifically, the amount of the oxide, metal nitride or metal carbide within the alloy is preferably not less than 4 mol % and not more than 30 mol %.

If the amount of the oxide, metal nitride or metal carbide within the non-magnetic layer 7 exceeds the above range, then residual oxide, metal nitride or metal carbide tends to be retained within the metal grains, which not only causes a loss in the crystallinity and orientation of the metal grains, but may result in the deposition of the oxide, metal nitride or metal carbide above and below the metal grains, making it difficult to achieve columnar structures in which the metal grains penetrate vertically through the non-magnetic layer 7, and increasing the possibility of a loss in crystallinity and orientation of the magnetic layer formed on top of the non-magnetic layer 7. In contrast, if the amount of the oxide, metal nitride or metal carbide within the non-magnetic layer 7 is less than the above range, then the effects obtained by adding the oxide, metal nitride or metal carbide tend not be obtained, which is also undesirable.

Figure 4:
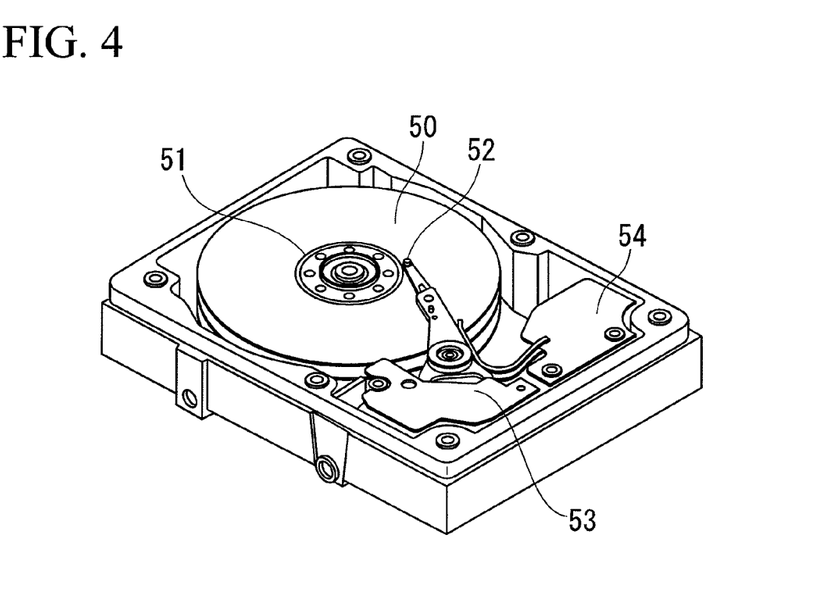
FIG. 4 is a perspective view illustrating one example of a magnetic recording/reproducing device.

FIG. 4 illustrates one example of a magnetic recording/reproducing device using the present invention.

This magnetic recording/reproducing device includes a magnetic recording medium 50 having the structure illustrated in FIG. 2, a medium drive unit 51 that rotates the magnetic recording medium 50, a magnetic head 52 that records and reproduces information to and from the magnetic recording medium 50, a head drive unit 53 that moves the magnetic head 52 relative to the magnetic recording medium 50, and a recording/reproducing signal processing system 54. The recording/reproducing signal processing system 54 can process data input from externally and transmit this data as recording signals to the magnetic head 52, as well as processing reproduction signals from the magnetic head 52 and transmitting the resulting data externally. Further, the magnetic head 52 used in the magnetic recording/reproducing device of the present invention may use any of the magnetic heads that are suitable for higher recording densities, such as a heads that employs a GMR (giant magneto resistance) element that uses a GMR effect as the reproduction element.

In the magnetic recording/reproducing device described above, by using the magnetic recording medium according to the present invention for the above-mentioned magnetic recording medium 50, miniaturization and magnetic isolation of the magnetic grains is promoted, the S/N ratio during reproduction can be increased significantly, the heat fluctuation properties can be improved, and a medium with excellent overwrite (OW) properties can be obtained. Accordingly, a superior magnetic recording/reproducing device that is particularly suitable for high-density recording can be obtained.

EXAMPLES

The effects of the present invention are described in more detail below based on a series of examples. However, the present invention is not limited to the examples described below, and all manner of modifications are possible without departing from the scope of the invention.

Example 1

In example 1, first, a cleaned glass substrate (manufactured by Konica Minolta Holdings Inc., outer shape: 2.5 inches) was mounted inside the deposition chamber of a DC magnetron sputtering apparatus (C-3040 manufactured by ANELVA Corporation), and the deposition chamber was evacuated until an ultimate degree of vacuum of $1\times10^{-5}$ Pa was achieved. A Cr target was then used to deposit an adhesive layer with a thickness of 10 nm on the glass substrate. Subsequently, a soft magnetic layer having a thickness of 25 nm was deposited on the adhesive layer using a 55Fe-30Co-15Ta target {Fe content: 55 at %, Co content: 30 at %, Ta content: 15 at %} with the substrate temperature set to not more than 100° C. A Ru layer with a thickness of 1.6 nm was then formed, and a further soft magnetic layer of Co-20Fe-5Zr-5Ta with a thickness of 25 nm was deposited on top of the Ru layer, completing formation of a soft magnetic underlayer.

Further, during deposition of the above soft magnetic underlayer, a negative bias of −200 V was applied to the glass substrate.

Measurements using a vibrating sample magnetometer (VSM) confirmed that the magnetic permeability of the soft magnetic underlayer was 7,000 (H/m), that the arithmetic product Bs·t (T·nm) of the saturation magnetic flux density Bs (T) and the thickness t (nm) of the soft magnetic underlayer was 65 (T·nm), and that the soft magnetic underlayer had undergone AFC using the second appearing peak of the antiferromagnetic coupling force.

Next, using a Ni-6W target {W content: 6 at %, Ni content: remainder} and a Ru target, layers of thickness 5 nm and 20 nm respectively were deposited sequentially on top of the above soft magnetic underlayer 2, thus forming an orientation control layer.

Subsequently, a magnetic layer with a composition of (Co15Cr16Pt)91-(SiO$_2$)6-(TiO$_2$)3 {containing 91 mol % of an alloy having a Cr content of 15 at %, a Pt content of 18 at % and the remainder Co, 6 mol % of an oxide composed of SiO$_2$, 3 mol % of an oxide composed of Cr$_2$O$_3$, and 3 mol % of an oxide composed of TiO$_2$} was deposited with a thickness of 3 nm on top of the orientation control layer 3 using a sputtering pressure of 2 Pa. In this magnetic layer, Ku was $2.2\times10^6$ (erg/cc) and Ms was 500 (emu/cc).

Next, a non-magnetic layer composed of (Co30Cr)88-(TiO$_2$)12 was deposited with a thickness of 0.3 nm on top of the magnetic layer.

A magnetic layer composed of (Co11Cr18Pt)92-(SiO$_2$)5-(TiO$_2$)3 was then deposited with a thickness of 4 nm on the above non-magnetic layer using a sputtering pressure of 2 Pa.

Subsequently, a non-magnetic layer composed of Ru was deposited with a thickness of 0.3 nm on top of the magnetic layer. In this magnetic layer, Ku was $4\times10^6$ (erg/cc) and Ms was 600 (emu/cc).

Next, a magnetic layer with a thickness of 4 nm was deposited on top of the above non-magnetic layer using a target composed of Co20Cr14Pt3B {Cr content: 20 at %, Pt content: 14 at %, B content: 3 at %, Co content: remainder} and at a sputtering pressure of 0.6 Pa. In this magnetic layer, Ku was $1.5\times10^6$ (erg/cc) and Ms was 400 (emu/cc).

Next, a protective layer having a thickness of 3.0 nm was deposited using a CVD method, and a dipping method was then used to form a lubricant layer composed of a perfluoropolyether, thereby completing preparation of the magnetic recording medium of example 1.

Example 2

In example 2, a soft magnetic layer having a thickness of 25 nm was deposited on the adhesive layer using a 55Fe-30Co-16Ta-3Zr target {Fe content: 55 at %, Co content: 30 at %, Ta content: 16 at %, Zr content: 3 at %} with the substrate temperature set to not more than 100° C., a Ru layer with a thickness of 1.6 nm was then formed, and a further soft magnetic layer of Co-20Fe-5Zr-5Ta with a thickness of 25 nm was deposited on top of the Ru layer to complete formation of the soft magnetic underlayer. The remaining preparation was performed under the same conditions as those described for example 1, yielding a magnetic recording medium.

Example 3

In example 3, a soft magnetic layer having a thickness of 25 nm was deposited on the adhesive layer using a 55Fe-30Co-14Ta-3B target {Fe content: 55 at %, Co content: 30 at %, Ta content: 14 at %, B content: 3 at %} with the substrate temperature set to not more than 100° C., a Ru layer with a thickness of 1.6 nm was then formed, and a further soft magnetic layer of Co-20Fe-5Zr-5Ta with a thickness of 25 nm was deposited on top of the Ru layer to complete formation of the soft magnetic underlayer. The remaining preparation was performed under the same conditions as those described for example 1, yielding a magnetic recording medium.

Example 4

In example 4, a negative bias of −300 V was applied to the glass substrate during deposition of the upper soft magnetic layer (Co-20Fe-5Zr-5Ta) of the soft magnetic underlayer. The remaining preparation was performed under the same conditions as those described for example 1, yielding a magnetic recording medium.

Example 5

In example 5, a negative bias of −300 V was applied to the glass substrate during deposition of the upper soft magnetic layer (Co-20Fe-5Zr-5Ta) of the soft magnetic underlayer. The remaining preparation was performed under the same conditions as those described for example 2, yielding a magnetic recording medium.

Example 6

In example 6, a negative bias of −300 V was applied to the glass substrate during deposition of the upper soft magnetic layer (Co-20Fe-5Zr-5Ta) of the soft magnetic underlayer. The remaining preparation was performed under the same conditions as those described for example 3, yielding a magnetic recording medium.

Comparative Example 1

In comparative example 1, in order to employ the strongest antiferromagnetic coupling conditions for the soft magnetic underlayer, the thickness of the Ru layer was set to 0.5 nm, and the magnetic permeability of the soft magnetic underlayer was set to 3,000 (H/m). Further, a negative bias was not applied to the glass substrate during deposition of the soft magnetic underlayer. The remaining preparation was performed under the same conditions as those described for example 1, yielding a magnetic recording medium.

Comparative Example 2

In comparative example 2, a soft magnetic layer having a thickness of 25 nm was deposited on the adhesive layer using a 55Fe-30Co-16Ta-3Zr target {Fe content: 55 at %, Co content: 30 at %, Ta content: 16 at %, Zr content: 3 at %} with the substrate temperature set to not more than 100° C., a Ru layer with a thickness of 1.6 nm was then formed, and a further soft magnetic layer of Co-20Fe-5Zr-5Ta with a thickness of 25 nm was deposited on top of the Ru layer to complete formation of the soft magnetic underlayer. The remaining preparation was performed under the same conditions as those described for comparative example 1, yielding a magnetic recording medium.

Comparative Example 3

In comparative example 3, a soft magnetic layer having a thickness of 25 nm was deposited on the adhesive layer using a 55Fe-30Co-14Ta-3B target {Fe content: 55 at %, Co content: 30 at %, Ta content: 14 at %, B content: 3 at %} with the substrate temperature set to not more than 100° C., a Ru layer with a thickness of 1.6 nm was then formed, and a further soft magnetic layer of Co-20Fe-5Zr-5Ta with a thickness of 25 nm was deposited on top of the Ru layer to complete formation of the soft magnetic underlayer. The remaining preparation was performed under the same conditions as those described for comparative example 1, yielding a magnetic recording medium.

Each of the magnetic recording media from these examples 1 to 6 and comparative examples 1 to 3 was evaluated for recording and reproduction properties, namely the S/N ratio, the overwrite (OW) properties and the heat fluctuation properties, using a Read/Write Analyzer RWA1632 and a Spin Stand S1701MP manufactured by Guzik Technical Enterprises, USA. The results of the evaluations are shown in Table 1.

For the magnetic head, a head having a single magnetic pole on the writing side and a TMR element on the reading side was used.

The S/N ratio was measured at a recording density of 750 kFCI.

Further, the recording properties (OW properties) were evaluated by first writing a signal of 750 kFCI, subsequently performing overwriting with a signal of 100 kFCI, performing an extraction of the high-frequency components with a frequency filter, and then evaluating the data-writing capabilities based on the residual ratio.

The thermal fluctuation properties were evaluated by conducting writing at a recording density of 50 kFCI under conditions including a temperature of 70° C., and then calculating the attenuation factor of the output relative to the reproduction output one second after the writing on the basis of the formula: (So−S)×100/(So). In this formula, So represents the reproduction output one second after writing, and S represents the reproduction output 10,000 seconds after writing.

TABLE 1

|  | Soft magnetic underlayer | AFC coupling peak position (number) | Substrate bias (V) | Magnetic permeability | S/N (dB) | OW (dB) | Heat fluctuation (%) |
|---|---|---|---|---|---|---|---|
| Example 1 | 55Fe—30Co—15Ta/Ru/ 70Co—20Fe—5Zr—5Ta | 2 | −200 | 1500 | 17.1 | 35.5 | 0.4 |
| Example 2 | 55Fe—30Co—16Ta—3Zr/Ru/ 70Co—20Fe—5Zr—5Ta | 2 | −200 | 1350 | 16.8 | 33.7 | 0.4 |
| Example 3 | 55Fe—30Co—14Ta—3B/Ru/ 70Co—20Fe—5Zr—5Ta | 2 | −200 | 1450 | 16.7 | 34.6 | 0.4 |

As illustrated in Table 1, compared with the magnetic recording media of comparative examples 1 to 3 which fall outside the scope of the present invention, the magnetic recording media of examples 1 to 6 according to the present invention exhibit higher magnetic permeability of the soft magnetic underlayer, with each medium having a magnetic permeability value exceeding 1,000 H/m. Further, it is also evident that the magnetic recording media of examples 1 to 6 exhibit superior recording and reproduction properties to the magnetic recording media of comparative examples 1 to 3. Hence, it is clear from the description above that the present invention is able to realize a magnetic recording medium in which the soft magnetic underlayer combines high magnetic permeability with antiferromagnetic coupling.

INDUSTRIAL APPLICABILITY

The present invention is able to realize a soft magnetic underlayer that combines high magnetic permeability with antiferromagnetic coupling, and therefore leaked magnetic flux emitted from the domain walls of the soft magnetic underlayer can be prevented from entering the reproducing head, and the domain walls that exist within the soft magnetic underlayer are fixed to prevent easy movement, enabling low noise characteristics to be obtained. Further, the leaked magnetic field from the magnetized transition region of the perpendicular magnetic layer and the magnetic field from the magnetic head are drawn sharply into the soft magnetic layer, thereby enabling stabilization of the magnetization recorded within the perpendicular magnetic layer and more effective extraction of the writing magnetic field from the magnetic head.

| DESCRIPTION OF THE REFERENCE SYMBOLS | |
| --- | --- |
| 1 | Non-magnetic substrate |
| 2 | Soft magnetic underlayer |
| 2a | Magnetic layer |
| 2b | Spacer layer |
| 3 | Orientation control layer |
| 4 | Perpendicular magnetic layer |
| 4a | Lower magnetic layer |
| 4b | Middle magnetic layer |
| 4c | Upper magnetic layer |
| 5 | Protective layer |
| 6 | Lubricant layer |
| 7 | Non-magnetic layer |
| 8 | Non-magnetic underlayer |
| 7a | Lower non-magnetic layer |
| 7b | Upper non-magnetic layer |
| 41 | Oxide |
| 42 | Magnetic grains (or non-magnetic grains within layers 7a and 7b) |
| 50 | Magnetic recording medium |
| 51 | Medium drive unit |
| 52 | Magnetic head |
| 53 | Head drive unit |
| 54 | Recording/reproducing signal processing system |

The invention claimed is:

1. A magnetic recording medium, comprising at least a non-magnetic substrate on which is laminated a soft magnetic underlayer formed by antiferromagnetic coupling of a plurality of soft magnetic layers, and a perpendicular magnetic layer for which an axis of easy magnetization is oriented mainly perpendicularly to the non-magnetic substrate, wherein
    the soft magnetic layers comprise Fe as a first main component, Co as a second main component, and also comprise Ta, in which the soft magnetic layer nearest to the perpendicular magnetic layer is obtainable by depositing by sputtering while applying a negative bias within a range from −150 to −400 V to the non-magnetic substrate, and
    the soft magnetic underlayer is antiferromagnetically coupled using a second peak or a subsequently appearing peak of an antiferromagnetic coupling force, which changes according to a thickness of a spacer layer sandwiched between the plurality of soft magnetic layers, and a magnetic permeability of the soft magnetic underlayer is not less than 1,000 H/m.

2. The magnetic recording medium according to claim 1, wherein the soft magnetic layers comprise a Fe:Co ratio (atomic ratio) within a range from 60:40 to 70:30, and also comprise 13 to 16 atomic % of Ta.

3. The magnetic recording medium according to claim 2, wherein the soft magnetic underlayer is antiferromagnetically coupled using a second appearing peak of the antiferromagnetic coupling force.

4. A magnetic recording/reproducing device, comprising the magnetic recording medium according to claim 3, and
    a magnetic head that performs recording and reproduction of information to and from the magnetic recording medium.

5. A magnetic recording/reproducing device, comprising the magnetic recording medium according to claim 2, and
    a magnetic head that performs recording and reproduction of information to and from the magnetic recording medium.

6. The magnetic recording medium according to claim 1, wherein the soft magnetic underlayer is antiferromagnetically coupled using a second appearing peak of the antiferromagnetic coupling force.

7. A magnetic recording/reproducing device, comprising the magnetic recording medium according to claim 1, and
    a magnetic head that performs recording and reproduction of information to and from the magnetic recording medium.

8. The magnetic recording medium according to claim 1, wherein the spacer layer is a Ru film and the Ru of the spacer layer diffuses into the soft magnetic layer.

9. A magnetic recording/reproducing device, comprising a magnetic recording medium including at least a non-magnetic substrate on which is laminated a soft magnetic underlayer formed by antiferromagnetic coupling of a plurality of soft magnetic layers and a perpendicular magnetic layer for which an axis of easy magnetization is oriented mainly perpendicularly to the non-magnetic substrate, and
    a magnetic head that performs recording and reproduction of information to and from the magnetic recording medium, wherein
    the magnetic recording medium is manufactured by the method comprising:
    forming the soft magnetic layers comprising Fe as a first main component and Co as a second main component, and also comprising Ta,
    forming the soft magnetic underlayer by performing antiferromagnetic coupling using a second peak or a subsequently appearing peak of an antiferromagnetic coupling force, which changes according to a thickness of a spacer layer sandwiched between the plurality of soft magnetic layers, to obtain a soft magnetic underlayer with a magnetic permeability of not less than 1,000 H/m, and
    applying a negative bias within a range from −150 to −400 V to the non-magnetic substrate when forming the soft magnetic layer nearest to the perpendicular magnetic layer by sputtering.

10. A method of manufacturing a magnetic recording medium comprising at least a non-magnetic substrate on which is laminated a soft magnetic underlayer formed by antiferromagnetic coupling of a plurality of soft magnetic layers and a perpendicular magnetic layer for which an axis of easy magnetization is oriented mainly perpendicularly to the non-magnetic substrate, the method comprising:
- forming the soft magnetic layers comprising Fe as a first main component and Co as a second main component, and also comprising Ta,
- forming the soft magnetic underlayer by performing anti-ferromagnetic coupling using a second peak or a subsequently appearing peak of an antiferromagnetic coupling force, which changes according to a thickness of a spacer layer sandwiched between the plurality of soft magnetic layers, to obtain a soft magnetic underlayer with a magnetic permeability of not less than 1,000 H/m, and
- applying a negative bias within a range from −150 to −400 V to the non-magnetic substrate when forming the soft magnetic layer nearest to the perpendicular magnetic layer by sputtering.

* * * * *